Patented Apr. 2, 1940

2,195,747

UNITED STATES PATENT OFFICE 2,195,747

PRODUCTION OF LIQUID POLYMERIZATION PRODUCTS FROM OLEFINS

Emil Keunecke, Oppau, and Wilhelm Muench, Ludwigshafen - on - the - Rhine, Germany, assignors to I. G. Farbenindustrie Aktiengesellschaft, Frankfort-on-the-Main, Germany No Drawing. Application July 21, 1937, Serial No. 154,934. In Germany July 23, 1936

4 Claims. (Cl. 196—10)

The present invention relates to improvements in the production of liquid polymerization products, in particular of those having a low degree of polymerization, from olefins.

It is known that olefins can be polymerized in the presence of catalysts. Various substances have been proposed as catalysts, in particular aluminum chloride, aluminum bromide, boron fluoride and phosphoric acid. The polymerization products obtained with the said substances are either resins of high molecular weight or substances similar to lubricating oil or also mixtures of very varied hydrocarbons having a very wide boiling range between about 60° and 400° C. The said catalysts hitherto used for the reaction lose their activity rather rapidly without being capable of ready regeneration; in the case of aluminum chloride they are decomposed even by small amounts of water.

We have now found that aluminum fluoride is a very suitable catalyst for the polymerization of olefins to products which are liquid under ordinary conditions and that, contrary to expectation, the reaction proceeds in such manner that products mainly boiling below 200° C. are obtained.

Contrasted with other catalysts, such as aluminum chloride, aluminum bromide and boron fluoride, the aluminum fluoride has the further advantage that it is not decomposed by water and is stable to heat. In addition to the polymerization of mono-olefins, it may also be used for the polymerization of di-olefins forming products of similar nature.

As initial materials there may be mentioned in particular gaseous mono- or di-olefins, such as propylene, butylenes and butadiene or gases containing these olefins, but liquid olefins of low molecular weight, such as pentenes or isoprene or unsaturated hydrocarbons having more carbon atoms in the molecule also yield good results.

The mono- or di-olefins may be subjected to polymerization as such or in admixture with each other or in the presence of paraffinic hydrocarbons or other inert substances, in particular inert gases, as for example nitrogen.

The aluminum fluoride may be used in the anhydrous state as well as in a water-containing condition as it is usually available in commerce; it may be employed as such or on carriers. Suitable carriers are for example bleaching earths, active carbons, active silica gel and aluminum hydroxide gel.

By reason of the stability to heat of aluminum fluoride, the reaction may also be carried out at comparatively high temperatures, for example at temperatures of from about 160° up to about 500° C.; the most suitable temperatures range between 180° and 300° C. The composition of the polymerization product obtained is dependent on the reaction temperature used. In particular the yield of constituents of low boiling point is greater with increasing temperature.

It may be advantageous to work at elevated pressures, as for example between 1 and 50 atmospheres, because the yield per unit of time and space becomes greater with increasing pressure. Good results are also obtained, however, when working at atmospheric pressure.

The following examples will further illustrate the nature of this invention but the invention is not restricted to these examples.

Example 1

100 cubic centimeters (79.5 grams) of water-containing aluminum fluoride (corresponding to 50 grams of anhydrous aluminum fluoride) are heated in the form of grains of from 2 to 5 millimeters in diameter in an electric furnace to 220° C.; propylene gas of about 99 per cent purity is then led there over at the said temperature and at a speed of flow of 20 cubic centimeters per hour per cubic centimeter of catalyst space. The fraction converted amounts to 25.5 per cent by weight and the colorless polymerization product amounts to 17.7 grams per hour per kilogram of catalyst. 96 per cent by volume of the polymerization product free from propylene boil up to 200° C.

Example 2

Butadiene gas practically pure is led at 300° C. over 100 cubic centimeters of water-containing aluminum fluoride (corresponding to about 50 grams of anhydrous aluminum fluoride) with a speed of flow of 30 cubic centimeters per hour per cubic centimeter of catalyst space. A pale yellowish, readily mobile polymerization product is thus obtained. 15.8 per cent by weight of the butadiene introduced is converted and 21 grams of polymerization product are obtained per hour per kilogram of catalyst. 54 per cent by volume of the polymerization product free from butadiene pass over up to 200° C. On the other hand with a catalyst containing phosphoric acid at 220° C. and with a speed of flow of 30 cubic centimeters per hour, a polymerization product having a brown-black appearance is obtained of which only 20 per cent by volume pass over up to 200° C.

Example 3

Aluminum fluoride in the form of grains having a diameter of from 2 to 5 millimeters and a filling weight of 71 grams per 100 cubic centimeters filling volume is heated to 200° C. in an electrically heated tube. Thereupon a 99 per cent isobutylene gas is passed thereover at the said temperature and at a velocity of flow of 3 liters per hour. The fraction converted amounts to 58.2 per cent by weight and the yield of colorless polymerization product amounts to 40 grams per hour per liter of catalyst or 56.4 grams per hour per kilogram of catalyst. 98.1 per cent by volume of the polymerization product boil up to 190° C.

What we claim is:

1. A process for the polymerization of olefins of low molecular weight and boiling point to produce higher molecular weight, normally liquid products the major portion of which boils up to 200° C. which comprises contacting such olefin at a polymerizing temperature between 160 and 500° C. with aluminum fluoride.

2. In the process as claimed in claim 1 working in the presence of water.

3. In the process as claimed in claim 1 starting from a normally gaseous olefin.

4. In the process as claimed in claim 1 working at a temperature between 180° and 300° C.

EMIL KEUNECKE.
WILHELM MUENCH.